(12) United States Patent
Lippert et al.

(10) Patent No.: US 6,470,569 B1
(45) Date of Patent: Oct. 29, 2002

(54) METHOD FOR PRODUCING A COMPACT CATALYTIC REACTOR

(75) Inventors: Marco Lippert, Bibertal; Alois Tischler, Aidenbach; Marc Weisser, Owen, all of (DE)

(73) Assignee: Ballard Power Systems AG, Kirchheim/Teck-Nabern (DE)

( * ) Notice: Subject to any disclaimer, the term of this patent is extended or adjusted under 35 U.S.C. 154(b) by 0 days.

(21) Appl. No.: 09/701,902

(22) PCT Filed: May 29, 1999

(86) PCT No.: PCT/EP99/03737

§ 371 (c)(1),
(2), (4) Date: Feb. 12, 2001

(87) PCT Pub. No.: WO99/64146

PCT Pub. Date: Dec. 16, 1999

(30) Foreign Application Priority Data

Jun. 5, 1998 (DE) .......................... 198 25 102

(51) Int. Cl.[7] ................................ B23P 15/00
(52) U.S. Cl. ..................... 29/890; 29/890.054
(58) Field of Search ........................... 29/890, 890.054, 29/428; 422/177, 180; 228/180

(56) References Cited

U.S. PATENT DOCUMENTS

| | | | | |
|---|---|---|---|---|
| 4,521,947 A | * | 6/1985 | Nonnenmann et al. .. | 228/173.6 |
| 4,847,966 A | * | 7/1989 | Kuchelmeister ............ | 228/165 |
| 4,929,429 A | * | 5/1990 | Merry ......................... | 422/179 |
| 5,094,074 A | * | 3/1992 | Nishizawa et al. ........... | 29/890 |
| 5,152,060 A | | 10/1992 | Schubert et al. ....... | 29/890.039 |
| 5,406,704 A | * | 4/1995 | Retallick ..................... | 29/890 |
| 5,437,099 A | * | 8/1995 | Retallick et al. .............. | 29/458 |
| 5,514,347 A | * | 5/1996 | Ohashi et al. ................ | 29/890 |
| 5,608,968 A | * | 3/1997 | Maus et al. ................... | 29/890 |
| 5,737,839 A | * | 4/1998 | Whittenberger et al. ...... | 29/890 |
| 5,791,043 A | * | 8/1998 | Okabe et al. ................ | 156/209 |
| 5,791,044 A | * | 8/1998 | Whittenberger et al. ...... | 29/890 |
| 5,852,274 A | * | 12/1998 | Watanabe et al. ............ | 422/180 |
| 5,948,371 A | * | 9/1999 | Hafele ......................... | 422/174 |

FOREIGN PATENT DOCUMENTS

| | | |
|---|---|---|
| DE | 39 26 466 A1 | 2/1991 |
| DE | 197 08 472 A1 | 9/1998 |
| EP | 0 430 184 A2 | 11/1990 |
| WO | WO 88/06941 | 6/1999 |

* cited by examiner

*Primary Examiner*—I Cuda Rosenbaum
(74) *Attorney, Agent, or Firm*—Crowell & Moring LLP

(57) ABSTRACT

A process for producing a compact catalytic reactor, in which reaction spaces or heat-transfer spaces are formed by stacking at least partially structured plates alternately one on top of the other, a catalyst is introduced into the reaction spaces, and the plates are provided with a layer of solder at least in the edge region, but not in the region provided with catalyst material, and, after stacking them one on top of the other, are soldered to form a reactor. In addition, the plates may be provided with a bent-up edge region a for easy positioning and for increasing the leak tightness. Finally, an unstructured intermediate plate may also be respectively provided between the structured plates.

10 Claims, 4 Drawing Sheets

METHOD FOR PRODUCING A COMPACT CATALYTIC REACTOR

BACKGROUND AND SUMMARY OF THE INVENTION

This application claims the priority of PCT International Patent Application No. PCT/EP99/03737, filed May 29, 1999 (29.05.99) and German patent document 198 25 102.5, filed Jun. 5, 1998 (05.06.98), the disclosure of which is expressly incorporated by reference herein.

The invention relates to a process for making a compact catalytic reactor.

Such compact catalytic reactors, so-called micro-reactors, comprise individual thin, finely structured plates or sheets, in which the structuring provides fine flow channels for the distribution of the required media. The sheets are stacked one on top of the other and are provided with bottom and top plates as well as with supply and discharge ducts for the media, so that a compact component is produced. The sheets are subsequently joined together in a gastight manner, preferably by diffusion welding. International patent document WO 88/06941 discloses, for example, a micro heat exchanger of microstructured sheets, which is joined together by soldering.

It is an object of the invention to provide a simple and inexpensive process for making a compact catalytic reactor of this type.

This and other objects and advantages are achieved by the manufacturing according to the invention, which provides a compact catalytic reactor with adequate leak tightness and mechanical strength. Since a layer of solder is provided on all the plates, at least in the edge region, neighboring plates are connected to one another in a gastight manner by the soldering operation, at least in this edge region, so that closed-off reaction or heat-transfer spaces form between respective neighboring plates. At the same time, a layer of solder is not introduced in the regions of the plates in which catalyst material is provided. As a result, damage to the catalyst material by the solder material can be avoided.

The strength in the region of the plates which is provided with catalyst is established exclusively by mechanical contact. If, in addition, all the plates which have no catalyst material are provided completely with a layer of solder, soldered connections are also produced in the central regions of these plates, so that the mechanical strength of the reactor can be further improved.

The bending up of the edge regions allows the plates to be positioned in a simple way during stacking one on top of the other and to be fixed during the soldering operation. At the same time, leak tightness is improved.

Other objects, advantages and novel features of the present invention will become apparent from the following detailed description of the invention when considered in conjunction with the accompanying drawings.

DETAILED DESCRIPTION OF THE DRAWINGS

Figure 1:
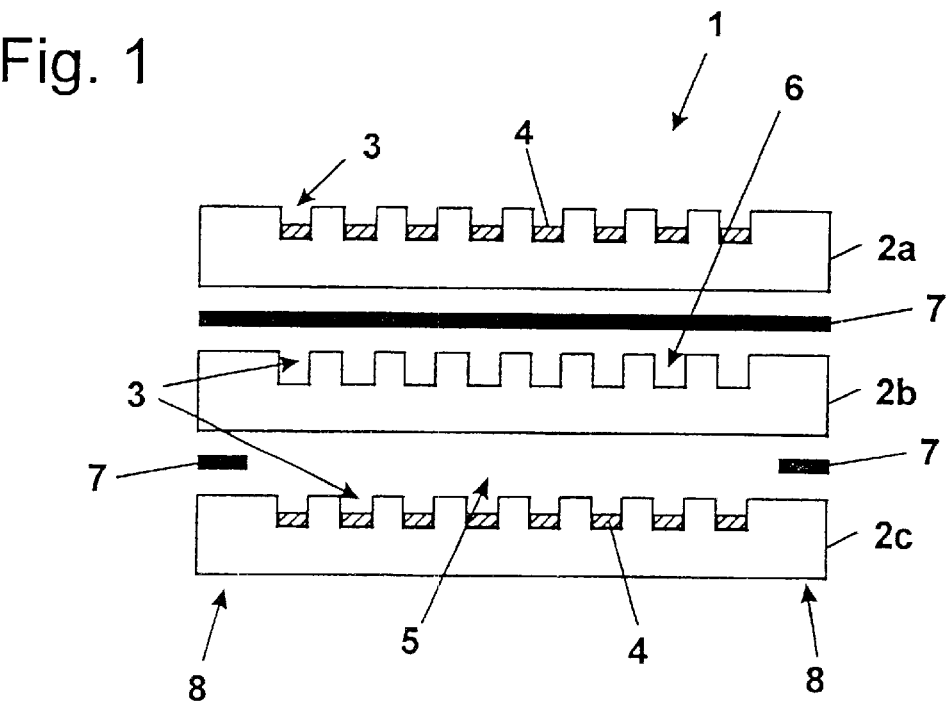
FIG. 1 is a basic representation of a reactor to be produced according to the invention.

The structure of catalytic reactors in plate form is generally known from the prior art and is therefore explained here only briefly with reference to FIG. 1. The catalytic reactor 1 is constructed by stacking plates, preferably in the form of metal foils 2a–2c, one on top of the other. The metal foils 2a–2c have microstructures worked into at least part of the surface, for example in the form of channels 3, which serve for better distribution of the reaction media involved. By stacking the metal foils 2a–2c one on top of the other, a reaction space 5, provided with a catalyst material 4, and a heat-transfer space 6, flowed through by a heat-transfer medium, are formed between the individual metal foils 2a–2c. The stack of metal foils 2a–2c is respectively closed off in the stacking direction by end plates (not shown). Supply of the reaction media may take place in any desired form inside or outside the stack of plates, preferably through supply and discharge channels, which extend in the stacking direction. These are formed by corresponding bores in the metal foils 2a–2c but are not represented for the sake of simplicity. The supply and discharge of the reaction media to and from these supply channels takes place via the end plates.

In principle, such a catalytic reactor 1 has the function of discharging thermal energy from the reaction space 5 via a heat-transfer medium (exothermic reaction) or introducing it into the reaction space 5 (endothermic reaction). (A thermal oil may be used for example as the heat-transfer medium.) In the case of endothermic reactions, it is also possible, however, to generate the thermal energy required directly in the heat-transfer space 6. For this purpose, a chemical fuel is introduced into the heat-transfer space 6 as a heat-transfer medium and is oxidized there with the aid of a suitable catalyst and the addition of oxygen. For this purpose, platinum-containing catalysts may be used for example. The energy released during the oxidation is transferred to the reaction space 5. The catalyst material 4 may be introduced into the reaction space 5 in any desired form, for example as a loose fill or pellets, but also by coating the metal foils.

Various reactions may take place in the reaction space 5. For example, a hydrogen-rich gas can be produced there from a hydrocarbon-containing fuel by water vapor reforming and/or partial oxidation. Furthermore, carbon monoxide contained in a hydrogen-rich gas can be removed there by selective oxidation. Finally, a fuel may be oxidized as completely as possible in the reaction space 5 (catalytic burner), the thermal energy released either being transferred to a heat-transfer medium or used directly for vaporizing a liquid medium. Such catalytic reactors are preferably used in so-called gas generating systems for mobile fuel cell applications, the hydrogen required for the fuel cell being generated in these gas generating systems from a fuel, for example methanol. It goes without saying that a catalytic reactor 1 produced according to the invention can, however, also be used for any other desired applications.

In the production of the catalytic reactor 1, the individual metal foils 2a–2c are connected to one another in a gastight manner by soldering. For this purpose, a layer of solder 7 is to introduced between respective neighboring metal foils 2a–2c. This layer of solder 7 extends at least over the edge region 8 of the metal foils 2a–2c. It may be introduced in the form of a soldering foil or by coating the upper side and/or underside of the metal foils 2a–2c. In the reaction space 5, the layer of solder 7 is removed in the region in which the catalyst material 4 is arranged. It therefore has a corresponding clearance 10, which is made for example by punching into the layer of solder 7. If the supply and discharge of the reaction media takes place as described above via supply channels running in the stacking direction, the circumference of some of the bores is likewise provided with a layer of solder 7. If a bore is provided with a layer of solder 7, the corresponding supply line is sealed off with respect to the associated reaction space 5 or heat-transfer space 6 after assembly. If a bore is not surrounded with a layer of solder 7, an exchange of the media can take place between the supply line and the associated reaction space 5 or heat-transfer space 6.

For producing the catalytic reactor 1, vacuum or inert-gas soldering processes known per se may be used, for example, the individual plates 2a–2c being soldered to one another by pressure and temperature. Work is carried out here, for example, at a temperature of 700°–1200° C. However, the temperature must be chosen such that the catalyst material 4 used is not damaged. A platinum-containing noble metal catalyst on an $Al_2O_3$ carrier material may be used for example as the catalyst material 4. The metal foils 2a–2c preferably consist of Cr—Ni steel with a thickness of 0.3–0.5 mm. The plates 2a–2c may, however, also consist of some other material suitable for this intended use. The layer of solder 7, preferably in the form of a copper or nickel solder, is optimized for the vacuum soldering process and preferably has a thickness of 30–100 mm. If the layer of solder 7 is applied by coating the plates 2a–c, the layer preferably has a thickness of 10–40 mm. To prevent soldering material from coming into contact with the catalyst material 4 during the soldering operation, in the region of the reaction space 5 the layer of solder 7 is merely provided in the edge region 8 of the metal foils. This is because the catalyst material 4 could be destroyed, or at least impaired in its function, by contact with the soldering material.

The exemplary embodiment represented in FIG. 1 shows an example of the structure of a catalytic reactor 1 made by the process according to the invention, with three metal foils 2a 2c. In reality, a catalytic reactor 1 generally has a multiplicity of such metal foils 2a–2c and is respectively bounded by end plates. In FIG. 1, all the metal foils 2a–2c are provided on the upper side with channels 3. After joining them together, a heat-transfer space 6 forms between the metal foils 2a and 2b. The channels 3 made in the metal foil 2c are filled at least partially with a catalyst material 4 or are correspondingly coated. Therefore, after joining them together, a reaction space 5 forms between the two metal foils 2b and 2c. While between the metal foils 2a and 2b (that is, in the region of the heat-transfer space 6) a continuous soldering foil 7 is provided, the corresponding soldering foil 7 between the metal foils 2b and 2c (in the region of the reaction space 5) extends only over the edge region 8. If the layer of solder 7 is introduced in the form of a soldering foil, the soldering foil is correspondingly punched out. If the layer of solder 7 is applied by coating, a covering is arranged in the region later provided with catalyst material 4. This covering can then be removed before joining the metal foils together, so that there is no layer of solder 7 in the region of the reaction space 5 provided with catalyst material 4.

In the exemplary embodiments, the channels 3 are all represented as equidistant and with the same cross section for the sake of simplicity. In reality, these channels 3 may be made in the metal foils 2a–2c in any desired arrangement and with variable cross sections. In particular, relatively large contiguous depressions may also be provided. After assembly, the reaction media can then be introduced in the same or opposite directions in relation to one another, or transversely.

Figure 2:
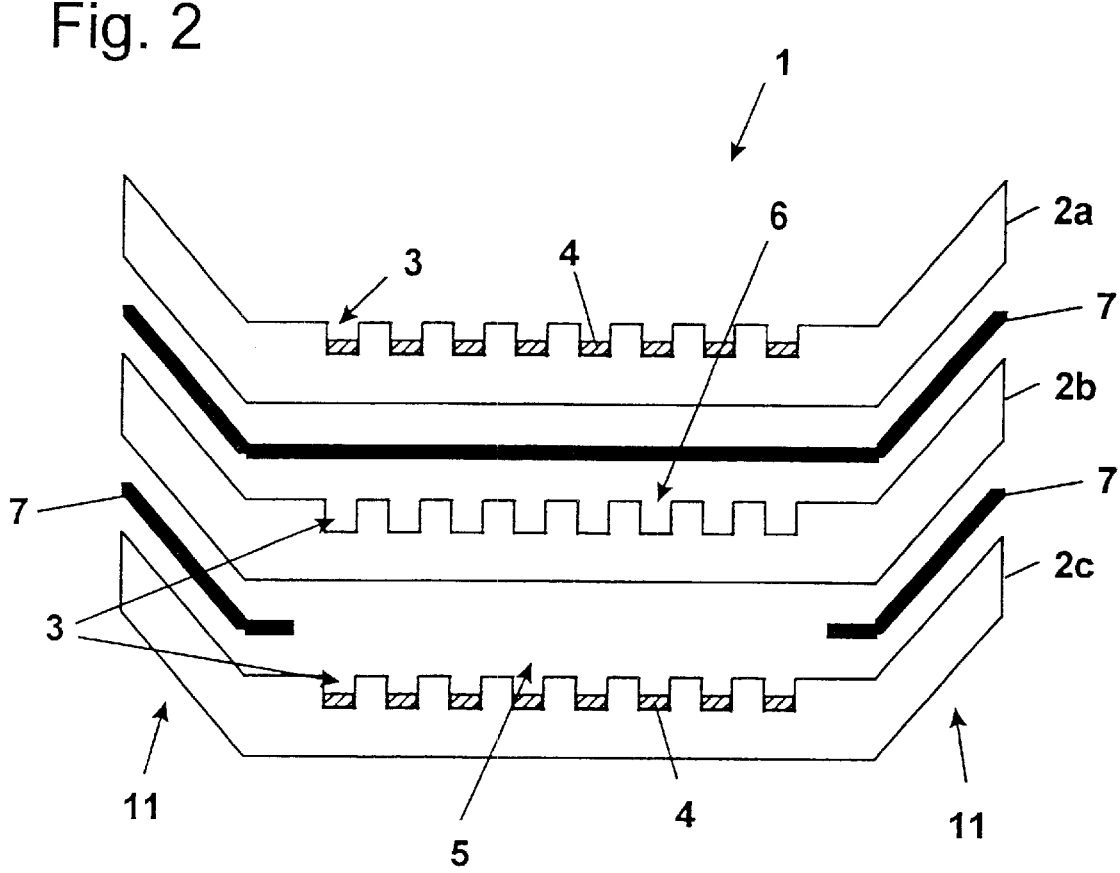
FIG. 2 shows a further refinement of a reactor to be produced according to the invention.

As a departure from FIG. 1, the metal foils 2a–2c in the exemplary embodiment according to FIG. 2 have a bent-up edge region 11. Otherwise, the same parts are identified by corresponding reference numerals. The bending over of the edge regions 11, which preferably takes place before the stacking of the metal foils 2a–2c one on top of the other, gives the metal foils 2a–2c a kind of pan shape. As a result, the metal foils 2a–2c are automatically positioned with respect to one another during stacking one on top of the other, and the leak tightness of the arrangement is improved as well. In this exemplary embodiment, too, the layer of solder 7 may be introduced in the form of a soldering foil or by coating the metal foils 2a–2c.

Figure 3:
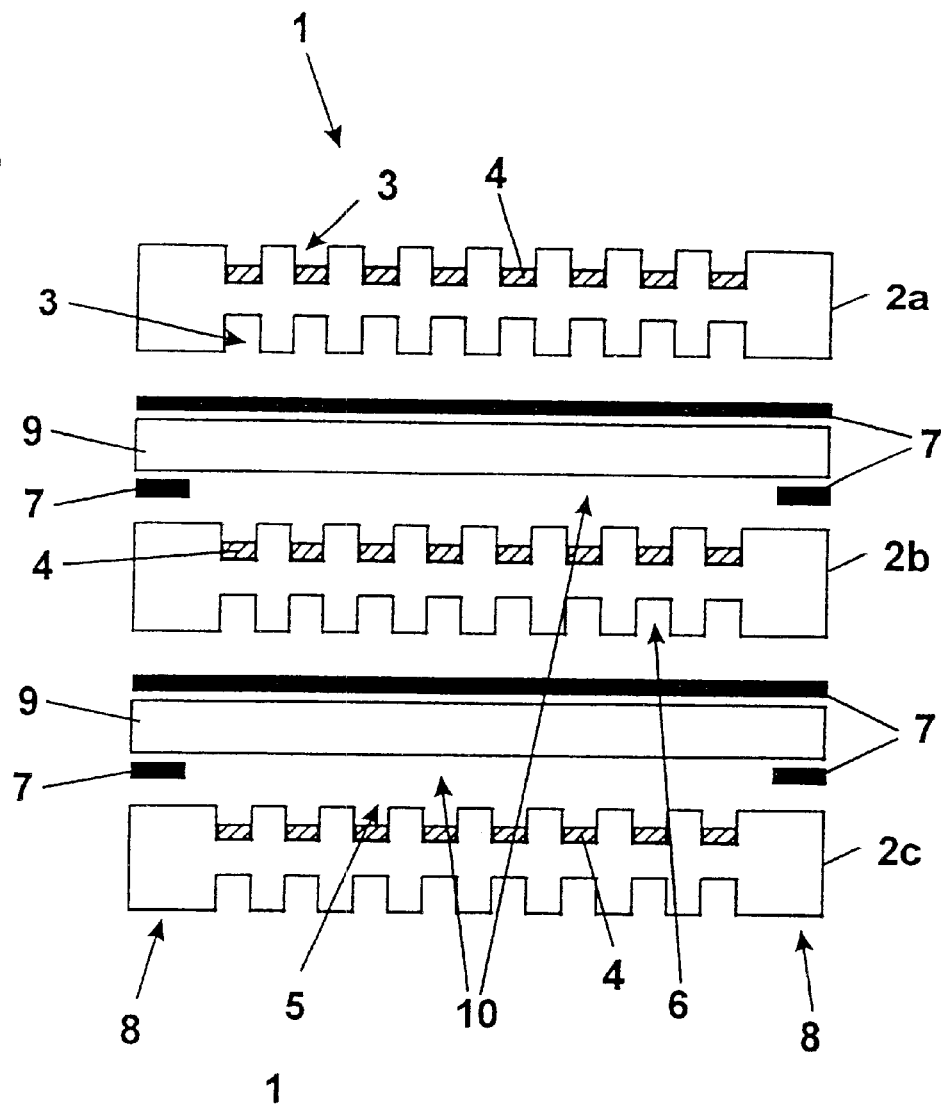
FIG. 3 shows a further exemplary embodiment of a reactor to be produced according to the invention, with intermediate layers.
Figure 4:
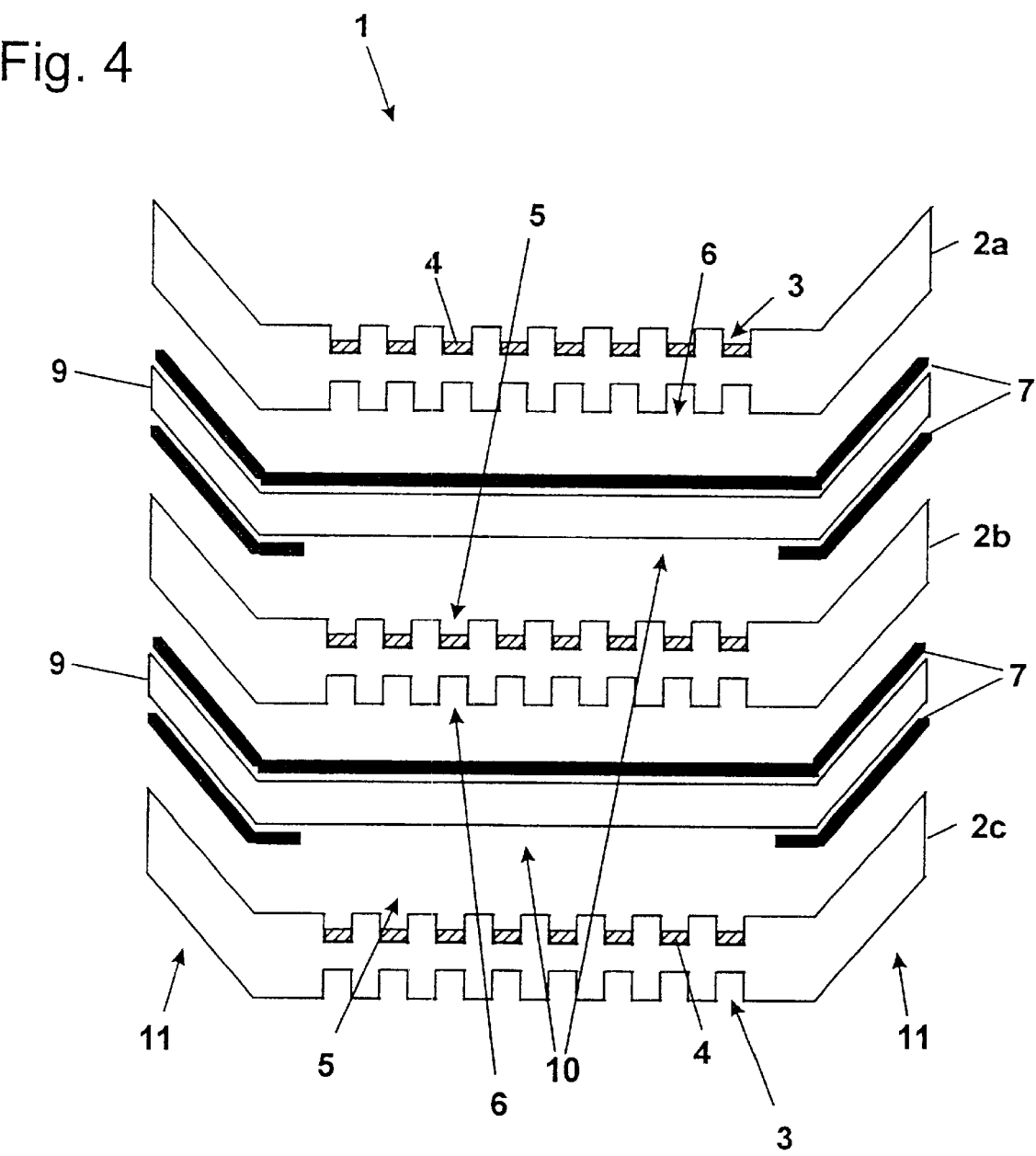
FIG. 4 shows a fourth exemplary embodiment of a reactor to be produced according to the invention, with intermediate layers.

In the catalytic reactors 1 according to FIGS. 3 and 4, unstructured intermediate plates 9 are added between the individual structured metal foils 2a–2c. As a departure from FIGS. 1 and 2, the metal foils 2a–2c have channels 3 on both sides. The respective upper channels 3 form a reaction space 5 in interaction with the neighboring intermediate plates 9, and the respective lower channels 3 correspondingly form a heat-transfer space 6. The intermediate plate 9 is therefore provided on the upper side (the surface facing the heat-transfer space 6) completely with a layer of solder 7, while the layer of solder 7 on the underside (the surface facing the reaction space 5) has a clearance 10. Consequently, in this arrangement with the intermediate plate 9 as well, the catalyst material 4 in the reaction space 5 does not come into contact with the layer of solder 7. Of course, it is apparent that the arrangement of the reaction space 5 or of the heat-transfer space 6 may also be changed over, with one in the place of the other. Furthermore, the spaces 5, 6 do not have to be arranged in the sequence represented. Rather, the sequence can be freely chosen. It is also possible to provide reaction spaces 5 or heat-transfer spaces 6 in a metal foil 2a–2c respectively on both sides.

In principle, the claimed production process provides a catalytic reactor 1 in which the individual metal foils 2a–2c are connected to one another in a secure and gastight manner, at least in the edge region 8, 11, by a soldered connection. Secure soldered connections are also obtained in the region of the heat-transfer spaces 6 between the elevations in the heat-transfer space 6 and the unstructured surface of the neighboring metal foil 2a–2c or intermediate plate 9. In the region of the reaction spaces 5, however, only mechanical connections are obtained. However, in combination with the existing soldered connections, these are adequate for the required load-bearing capacity of the catalytic reactors 1.

In the exemplary embodiment according to FIG. 4, the intermediate plates 9 also have a bent-up edge region 11. Under certain circumstances, it is desirable to provide a defined gap between the structured surfaces of the metal foils 2a–2c and the unstructured surfaces of the neighbouring metal foil 2a–2c or intermediate plates 9 in the region of the reaction space 5 and/or the heat-transfer space 6. In this case, an intermediate plate 9 which has corresponding depressions or clearances 10 over the entire region or else only a partial region of the reaction space 5 and/or the heat-transfer space 6 is used. Consequently, reaction spaces 5 and/or heat-transfer spaces 6 can be formed with a defined gap in a simple way.

Figure 5:
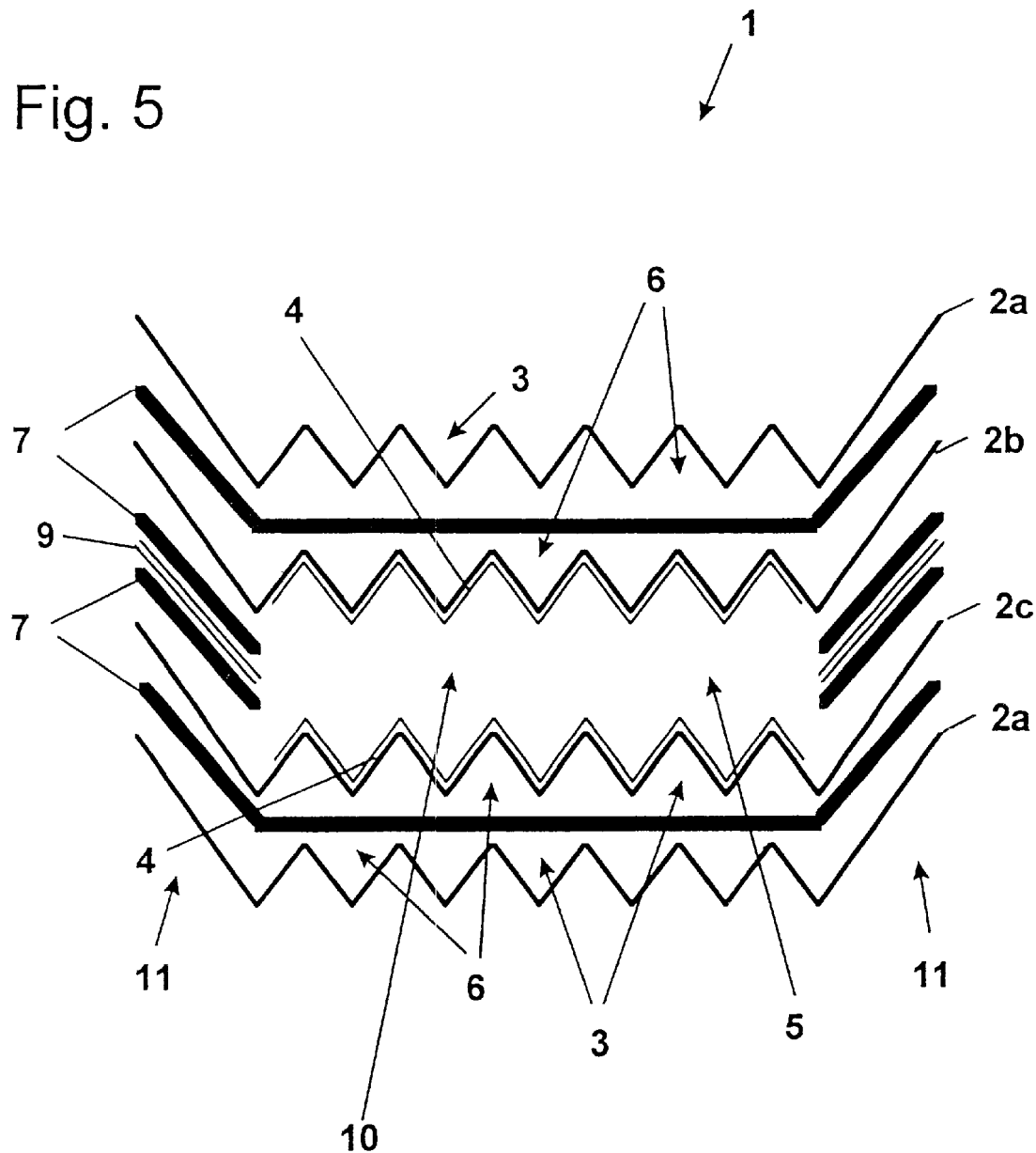
FIG. 5 shows a fifth exemplary embodiment of a reactor produced according to the invention, with corrugated sheets.

FIG. 5 shows such an example, in which the same parts again are identified by the same reference numerals. As a departure from the previous exemplary embodiments, in this case metal foils provided with structures are not used as plates 2a–2c, but instead corrugated sheets are used. The channels 3 are therefore formed by the corrugations of the sheets 2a–2c. In FIG. 4, the sequence of the individual component parts, and possibly also of the spaces 5, 6, likewise differs from the above exemplary embodiments. The structuring of the sheets 2a–2c is preferably configured in such a way that the corrugations of successive sheets do not run congruently but intersect. Therefore, during assembly, successive sheets are not pushed one into the other, but instead a corrugation trough of one sheet is respectively in contact with a corrugation crest of the next sheet, so that only punctiform soldered connections are produced.

The catalyst material 4 is introduced into the reaction space 5 by coating the sheets 2b, 2c. In this case, only the surfaces of the sheets 2b, 2c respectively facing the reaction space 5 are coated. In the exemplary embodiment according to FIG. 5, this means that the underside of the sheet 2a and the upper side of the sheet 2b in the region of the reaction space 5 are coated with catalyst material 4. The two sheets 2a, arranged right at the top and right at the bottom in the exemplary embodiment, and the edge regions 11 of all the sheets 2a–2c, are not coated with catalyst material 4. Consequently, heat-transfer spaces 6 are formed between the sheets 2a and 2b or between 2c and 2a. In the exemplary embodiment, a layer of solder 7 is respectively provided between the sheets 2a and 2b or between 2c and 2a, so that after the soldering process—during which the solder collects at the points of contact of the sheets—a respective single continuous heat-transfer space 6 forms. However, instead of this, it is also possible to provide an intermediate plate 9 having a layer of solder on both sides, so that then two successive heat-transfer spaces 6 would respectively form.

An intermediate plate 9 having a layer of solder 7 on both sides is provided between the two sheets 2b and 2c provided with catalyst material 4. This intermediate plate 9 has a clearance 10 in the region of the reaction space 5. As a result, a defined gap is formed between the sheets 2b and 2c. It would also be possible, however, to replace the intermediate plates 9 coated with solder by a corresponding simple layer of solder 7. In this case, such a gap would form. The only decisive factor is that again no layer of solder 7 is provided in the region of the reaction space 5. By analogy with the other exemplary embodiments, here too, the catalyst material may be introduced in the reaction space 5 in the form of a loose fill or pellets instead of the coating.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for producing a compact catalytic reactor, said process comprising:

forming respective reaction spaces and heat-transfer spaces, by stacking at least partially structured plates alternately one on top of the other;

introducing catalyst material into the reaction spaces;

providing a layer of solder at least in an edge region of the plates, but not in regions provided with catalyst material; and applying heat and pressure to the plates such that said layer of solder bonds the plates to form a catalytic reactor.

2. The process according to claim 1, wherein the catalyst material is introduced into the reaction spaces by one of: in the form of a loose fill, in the form of pellets, or by coating the plates.

3. The process according to claim 1, wherein metal foils or corrugated sheets are used as plates.

4. The process according to claim 1, wherein solder is introduced by one of: a coating of the plates and in the form of a layer of solder.

5. The process according to claim 4, wherein said step of providing a layer of solder comprises:

forming clearances in the layer of solder in a region of the reaction spaces having catalyst material.

6. The process according to claim 1, wherein the plates facing the heat-transfer space are coated completely with a layer of solder.

7. The process according to claim 1, further comprising:

bending the plates over at edges thereof before said stacking step; and providing at least the bent-up edge regions with a layer of solder.

8. The process according to claim 1, further comprising:

providing an unstructured intermediate plate between respective structured plates; and applying the layer of solder only to the intermediate plates, on both sides.

9. The process according to claim 8, wherein the layer of solder is removed on the surface of the intermediate plate facing the reaction space filled with catalyst material.

10. The process according to claim 8, wherein the intermediate plate has a depression and/or clearance, for forming a defined gap in at least one of the regions of the reaction space and the heat-transfer space.

* * * * *